US010944280B2

(12) United States Patent
Oughton, Jr.

(10) Patent No.: US 10,944,280 B2
(45) Date of Patent: Mar. 9, 2021

(54) AUTO ADJUSTING BALANCER APPARATUS

(71) Applicant: Eaton Intelligent Power Limited, Dublin (IE)

(72) Inventor: George William Oughton, Jr., Raleigh, NC (US)

(73) Assignee: Eaton Intelligent Power Limited

( * ) Notice: Subject to any disclaimer, the term of this patent is extended or adjusted under 35 U.S.C. 154(b) by 0 days.

(21) Appl. No.: 16/513,779

(22) Filed: Jul. 17, 2019

(65) Prior Publication Data
US 2019/0341795 A1  Nov. 7, 2019

Related U.S. Application Data

(63) Continuation of application No. 15/959,659, filed on Apr. 23, 2018, now Pat. No. 10,439,414, which is a continuation-in-part of application No. 15/467,475, filed on Mar. 23, 2017, now Pat. No. 10,381,917.

(51) Int. Cl.
*H02J 7/00* (2006.01)
*H02M 3/155* (2006.01)
*H02M 7/483* (2007.01)
*H02J 9/06* (2006.01)

(52) U.S. Cl.
CPC .......... *H02J 7/0063* (2013.01); *H02J 7/0016* (2013.01); *H02M 3/155* (2013.01); *H02M 7/483* (2013.01); *H02J 9/06* (2013.01); *H02J 2007/0067* (2013.01)

(58) Field of Classification Search
CPC .......... H02J 7/0063; H02J 7/0016; H02J 9/06; H02J 2007/0067; H02J 1/02; H02J 1/44; H02M 3/155; H02M 7/483; H02M 1/14; H02M 1/15
See application file for complete search history.

(56) References Cited

U.S. PATENT DOCUMENTS

| 5,253,157 A | 10/1993 | Severinsky |
| 5,644,483 A | 7/1997 | Peng et al. |
| 5,657,219 A | 8/1997 | Stanley |
| 5,723,913 A | 3/1998 | Weggel |

(Continued)

FOREIGN PATENT DOCUMENTS

| CN | 103986357 | 8/2014 |
| CN | 105141159 | 12/2015 |

(Continued)

OTHER PUBLICATIONS

Peng; *A Generalized Multilevel Inverter Topology with Self Voltage Balancing*; IEEE; 0-7803-6401-5; Oct. 8, 2000; pp. 2024-2031.

(Continued)

*Primary Examiner* — Kyle J Moody
(74) *Attorney, Agent, or Firm* — Stanek Lemon Crouse & Meeks, P.A.

(57) ABSTRACT

An apparatus includes a string of serially-connected energy storage devices, a string of serially-connected windings on at least one core and having a first medial node coupled to a first medial node of the string of serially-connected energy storage devices, and first and second switches configured to connect first and second end nodes of the string of serially-connected storage devices to respective first and second end nodes of the string of serially-connected energy storage devices. A control circuit is configured to operate the first and second switches at the same duty cycle.

8 Claims, 9 Drawing Sheets

(56) References Cited

U.S. PATENT DOCUMENTS

| | | |
|---|---|---|
| 5,814,965 A | 9/1998 | Randall |
| 6,031,738 A | 2/2000 | Lipo et al. |
| 6,038,157 A | 3/2000 | Mortimer |
| 6,483,730 B2 | 11/2002 | Johnson, Jr. |
| 7,095,206 B2 | 8/2006 | Lequesne |
| 7,295,448 B2 | 11/2007 | Zhu |
| 7,423,894 B2 | 9/2008 | Ilic |
| 7,924,580 B2 | 4/2011 | Glaser |
| 8,270,191 B2 | 9/2012 | Zhu |
| 9,030,854 B2 | 5/2015 | Escobar et al. |
| 9,077,257 B2 | 7/2015 | Frium |
| 9,297,862 B2 | 3/2016 | Oughton, Jr. et al. |
| 9,362,743 B2 | 6/2016 | Gazit et al. |
| 9,379,632 B2 | 6/2016 | Akagi et al. |
| 9,748,862 B2 | 8/2017 | Cheng et al. |
| 9,755,533 B2 | 9/2017 | Imai |
| 9,873,342 B2 | 1/2018 | De Sousa et al. |
| 10,003,275 B2 | 6/2018 | Chen .................... H02M 7/003 |
| 2013/0021827 A1 | 1/2013 | Ye .......................... H03F 1/025 363/17 |
| 2013/0229844 A1 | 9/2013 | Gazit et al. |
| 2014/0319916 A1 | 10/2014 | Cummings |
| 2015/0131349 A1 | 5/2015 | El-Barbari et al. |
| 2016/0329828 A1 | 11/2016 | Zhang et al. |
| 2016/0329832 A1 | 11/2016 | Aeloiza et al. |
| 2017/0272005 A1 | 9/2017 | Chen et al. |
| 2017/0310240 A1 | 10/2017 | Li et al. |
| 2018/0278074 A1 | 9/2018 | Oughton, Jr. |

FOREIGN PATENT DOCUMENTS

| | | |
|---|---|---|
| CN | 106385214 | 2/2017 |
| CN | 106533227 | 2/2017 |
| DE | 102006012164 | 7/2007 |
| EP | 2760115 | 7/2014 |
| JP | 2002142371 | 5/2002 |
| JP | 2008005630 | 1/2008 |
| KR | 10-1782222 | 9/2017 |
| WO | WO2010138234 | 12/2010 |

OTHER PUBLICATIONS

Chen, et al; *A Multi-level Converter Topology with Fault Tolerant Ability*; IEEE; 0-7803-8269-2; Feb. 22, 2004; pp. 1610-1616.

Chu et al.; A Novel Circulating Current Suppressing Method of Modular Multilevel Converter; 2014 IEEE Conference and Expo Transportation Electrification Asia-Pacific (ITEC Asia-Pacific) Nov. 3, 2014; pp. 1-5.

Wu et al.; Voltage Balancing Control of a Three-Phase Hybrid-Clamped Five-Level Inverter Based on Optimal Zero-Sequence Voltage Injection; 2014 16th European Conference on Power Electronics and Applications; IEEE Xplore; Sep. 29, 2014.

International Search Report and Written Opinion; PCT/US2018/023916; dated Jun. 19, 2018, 3 pages.

International Preliminary Report on Patentability; PCT/US2018/023916; dated Sep. 24, 2019; 8 pages.

Anno; *Double-Input Bidirectional DC/DC Converter using Cell-Voltage Equalizer with Flyback Transformer*; IEEE Transactions on Power Electronics, vol. 30, No. 6; Jun. 2015; pp. 2923-2934.

Extended Search Report; European Application No. 19169685.5; dated Sep. 3, 2019 (7 pages).

EP Office Action, EP Appln No. 18716822.4; dated Jul. 21, 2020; 6 pages.

AUTO ADJUSTING BALANCER APPARATUS

RELATED APPLICATIONS

The present application is a continuation of U.S. patent application Ser. No. 15/959,659 entitled "AUTO ADJUSTING BALANCER APPARATUS," filed Apr. 23, 2018, which is a continuation-in-part of U.S. patent application Ser. No. 15/467,475, entitled "POWER CONVERTER APPARATUS AND METHODS USING ADAPTIVE NODE BALANCING," filed Mar. 23, 2017, the contents of which are hereby incorporated herein by reference in their entireties.

BACKGROUND

The inventive subject matter relates to electrical apparatus and, more particularly, to power converter apparatus.

Power converter apparatus, such as uninterruptible power supply (UPS) systems, grid-tie inverters, and the like, commonly include an inverter that receives power from a DC link. The inverter may produce a single or three phase output that is referenced to a neutral, and the DC link may include first and second buses that have respective positive and negative voltages with respect to the neutral.

Unbalanced loads may cause DC bus imbalance problems in three phase inverter systems. In particular, loading one phase of the inverter output more substantially than the other phases may result in an imbalance in the voltages on the positive and negative DC buses of the DC link with respect to a neutral of the inverter. Such problems may be addressed through the use of a "balancer" circuit that intermittently couples the DC buses to the neutral, as described, for example, in U.S. Pat. No. 6,483,730 to Johnson, Jr. et al. Such conventional balancer circuits may, however, generate undesirable ripple currents, even when the load is not unbalanced.

SUMMARY

Some embodiments of the inventive subject matter provide an apparatus including first, second, third and fourth serially connected windings, a first switch configured to connect a first tap of the first winding to a first terminal of a first energy storage device, and a second switch configured to connect a second tap of the first winding and a first tap of the second winding to a second terminal of the first energy storage device and first terminal of a second energy storage device. The second tap of the second winding and a first tap of the third winding are connected to a second terminal of the second energy storage device and a first terminal of a third energy storage device. The apparatus further includes a third switch configured to connect a second tap of the third winding and a first tap of the fourth winding to a second terminal of the third energy storage device and a first terminal of a fourth energy storage device, and a fourth switch configured to connect a second tap of the fourth winding to a second terminal of the fourth energy storage device. A control circuit is configured to operate the first, second, third and fourth switches at a same duty cycle.

The first and second windings may be magnetically coupled to one another and the third and fourth windings may be magnetically coupled to one another. In some embodiments, the first and second windings may be wound on a first core and the third and fourth windings may be wound on a second core. A turns ratio of the first winding to the second winding may be 1:1 and wherein a turns ratio of the third winding to the fourth winding may be 1:1.

In further embodiments, the first, second, third and fourth windings may be magnetically coupled to one another. The first, second, third and fourth windings may be wound on a common core. A turns ratio of the first, second, third and fourth windings to one another may be 1:1.

In some embodiments, the duty cycle may be about 50%. In some embodiments, the duty cycle may be less than 40%.

In some embodiments, the apparatus may include a first diode connected between the first terminal of the first energy storage device and the second terminal of the fourth winding and a second diode connected between second terminal of the fourth energy storage device and first terminal of the first winding.

The first, second, third and fourth energy storage devices may include capacitors or batteries. The apparatus may include a multilevel inverter circuit coupled to the terminals of the first, second, third and fourth energy storage devices.

Additional embodiments provide an apparatus including a string of serially-connected energy storage devices, a string of serially-connected windings on at least one core and having a first medial node coupled to a first medial node of the string of serially-connected energy storage devices, and first and second switches configured to connect first and second end nodes of the string of serially-connected storage devices to respective first and second end nodes of the string of serially-connected energy storage devices. A control circuit is configured to operate the first and second switches at the same duty cycle.

DETAILED DESCRIPTION

Figure 1:
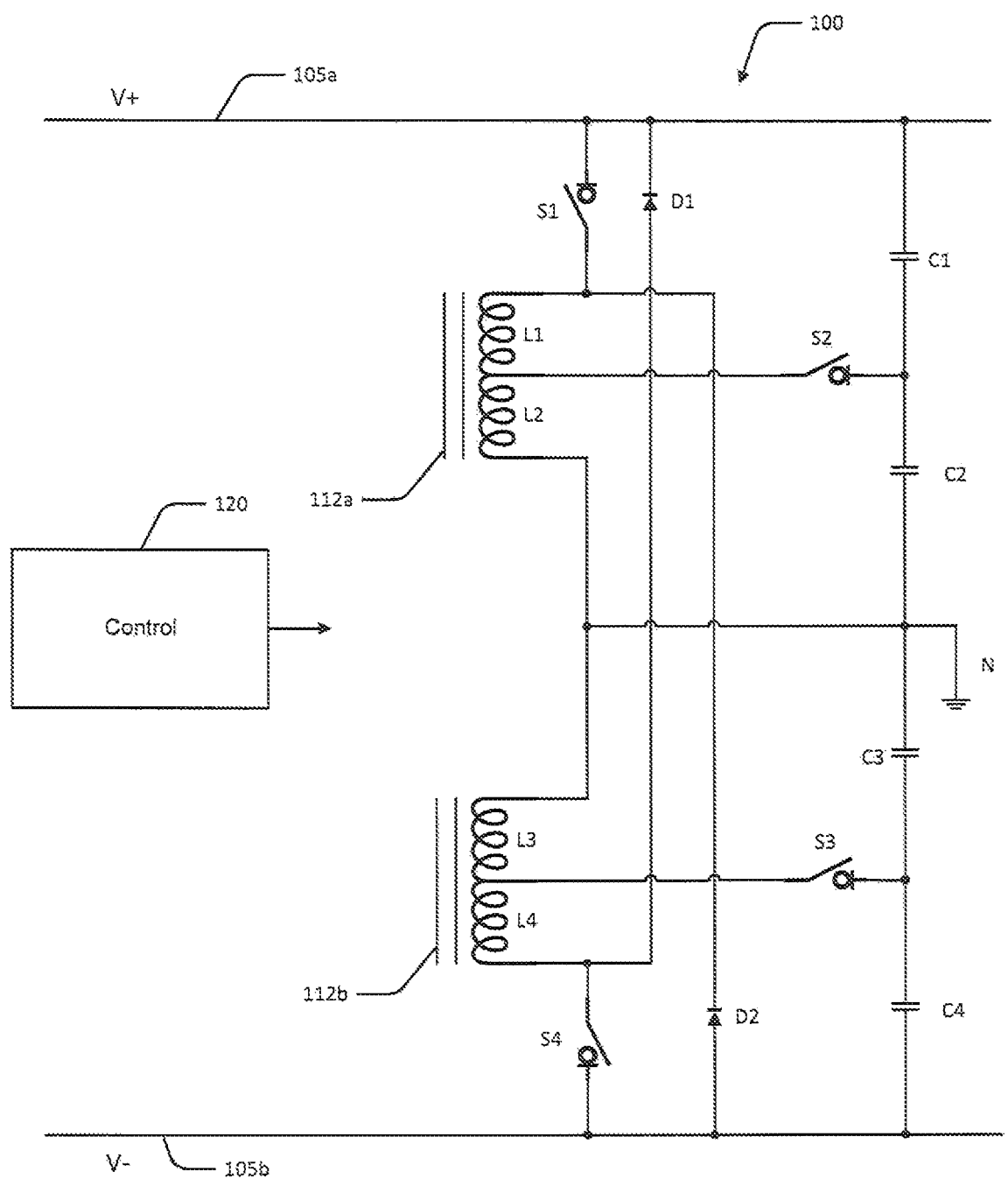
FIG. 1 is a schematic diagram illustrating a bus balancer apparatus according to some embodiments.

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like items. It will be understood that when an item is referred to as being "connected" or "coupled" to another item, it can be directly connected or coupled to the other item or intervening items may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, items, and/or components, but do not preclude the presence or addition of one or more other features, integers, steps, operations, items, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

FIG. 1 illustrates a bus balancer apparatus 100 according to some embodiments of the inventive subject matter. The apparatus 100 is configured to balance voltages across four capacitors C1, C2, C3, C4 that are serially connected between first and second DC buses 105a, 105b. The apparatus 100 includes four series-connected windings L1, L2, L3, L4, here shown as wound in pairs on two cores 112a, 112b. A first switch S1 is configured to couple a first terminal of the first winding L1 to the first DC bus 105a. A second switch S2 is configured to connect a second terminal of the first winding L1 and a first terminal of the second winding L2 to a medial node of the string of capacitors C1,C2, C3, C4 at which the first and second capacitors C1, C2 are connected. A second terminal of the second winding L2 and a first terminal of the third winding L3 are connected to a medial neutral node N at which the second and third capacitors C2, C3 are connected. In some embodiments, this node may not be tied to a neutral and the second terminal of the second winding L2 and the first terminal of the third winding could be coupled to this node via another switch (see, e.g., FIG. 5). A third switch S3 is configured to connect a second terminal of the third winding L3 and a first terminal of the fourth winding L4 to a medial node of the string of capacitors C1, C2, C3, C4 at which the third and fourth capacitors C3, C4 are connected. A fourth switch S4 is configured to connect a second terminal of the fourth winding L4 to the second DC bus 105b. A first diode D1 is connected between the second terminal of the fourth winding L4 and the first DC bus 105a, and a second diode D2 is connected between the first terminal of the first winding L1 and the second DC bus 105b.

Figure 2:
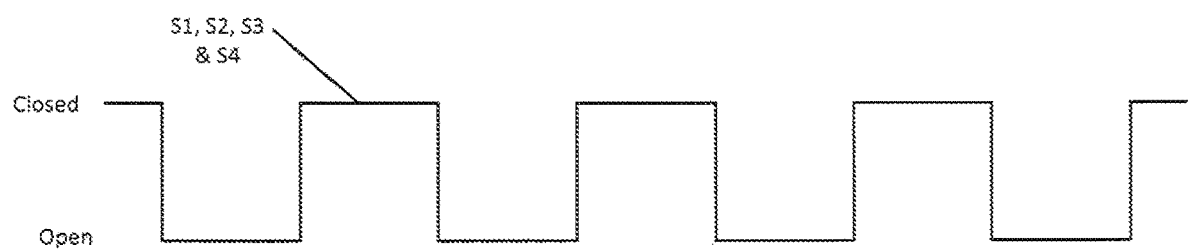
FIG. 2 is a waveform diagram illustrating operations of the apparatus of FIG. 1.

The windings L1, L2, L3, L4 preferably have an approximately 1:1 turns ratio, which is used to equalize voltages across the capacitors C1, C2, C3, C4. In some embodiments, a control circuit 120 controls the first, second, third and fourth switches S1, S2, S3, S4 such that the first, second, third and fourth switches S1, S2, S2, S3, S4 operate at the substantially the same duty cycle. More particularly, when the first, second, third and fourth switches S1, S2, S3, S4 are turned on, the 1:1 turns ratio of the first, second, third and fourth windings L1, L2, L3, L4 drives the magnitudes of the voltages across the capacitors C1, C2, C3, C4 toward equilibrium. The first, second, third and fourth switches S1, S2, S3, S4 are then turned off to initiate discharge of the first, second, third and fourth windings L1, L2, L3, L4 via the first and second diodes D1, D2 (which could be replaced by active switching devices that perform a similar function) and allow the flux in the magnetic cores 112a, 112b to fall to zero before the first, second, third and fourth switches S1, S2, S3, S4 are again turned on. In some embodiments, the first, second, third and fourth switches S1, S2, S3, S4 may be operated at a duty cycle preferably slightly less than 50%, as shown in FIG. 2. In some embodiments, the duty cycle can be less than shown in FIG. 2, although a significantly reduced duty cycle may lead to less desirable performance (e.g., increased ripple currents).

Figure 3:
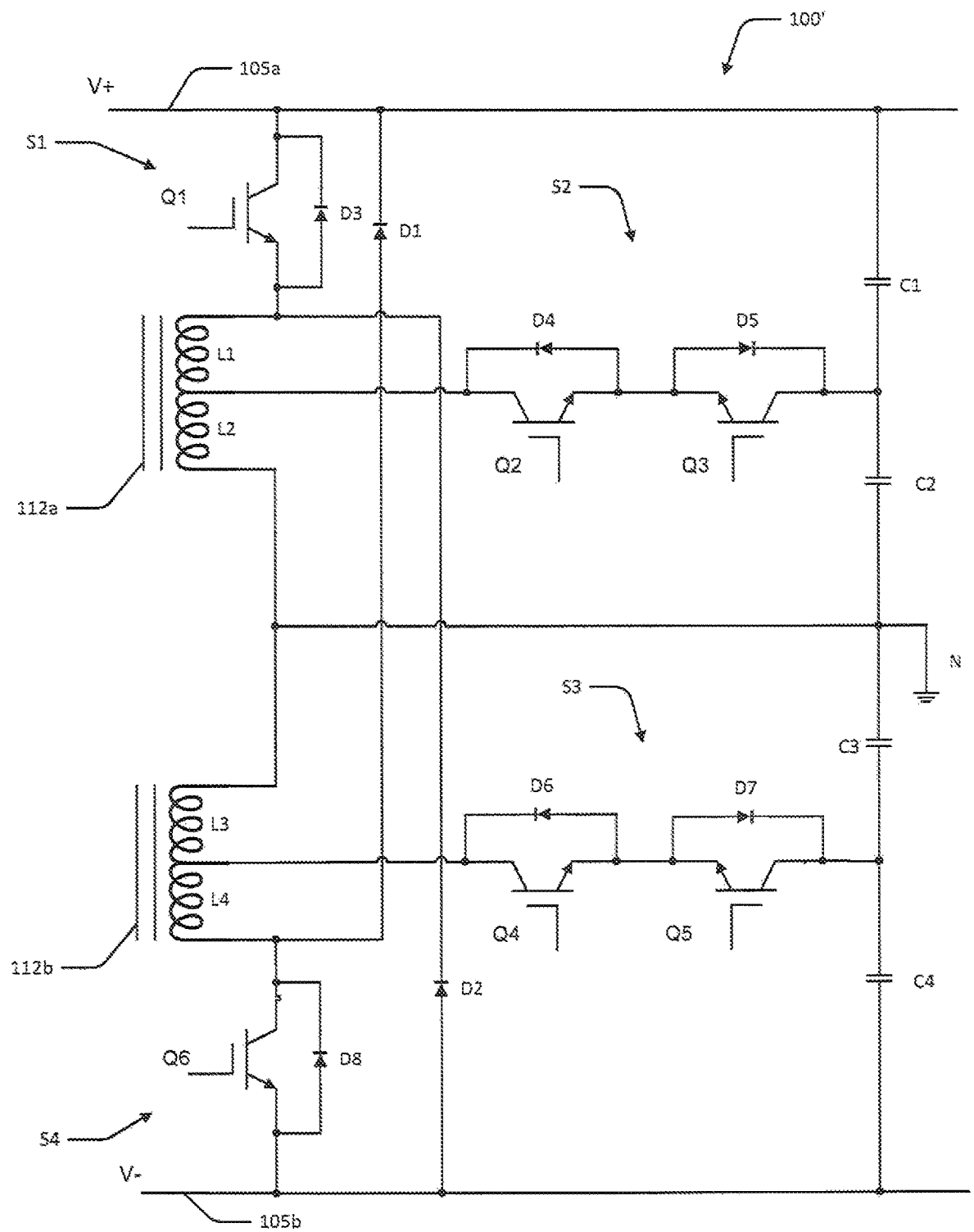
FIG. 3 is a schematic diagram illustrating a bus balancer apparatus using IGBT switching devices according to some embodiments.

It will be understood that the apparatus 100 may be implemented using any of a number of different types of components. In some embodiments, for example, the first, second, third and fourth S1, S2, S3, S4 may be implemented using transistors, such as insulated gate bipolar transistors (IGBTs) or power MOSFETs, or other types of semiconductor switches. Referring to FIG. 3, in an apparatus 100', the first and fourth switches S1, S4 may be bidirectional switches formed using IGBTs Q1, Q6 with respective diodes D3, D8. MOSFETs can be similarly used but can have intrinsic body diodes that can eliminate the need for separate diodes. The second and third switches S2, S3 may be bidirectional switches formed from series-connected IGBTs Q2, Q3, Q4, Q5 with respective diodes D4, D5, D6, D7. According to further embodiments, instead of the two-core arrangement illustrated in FIG. 1, a bus balancer apparatus 100" according to further embodiments may include windings L1, L2, L3, L4 wound on a single common core 412, as shown in FIG. 4.

Figure 4:
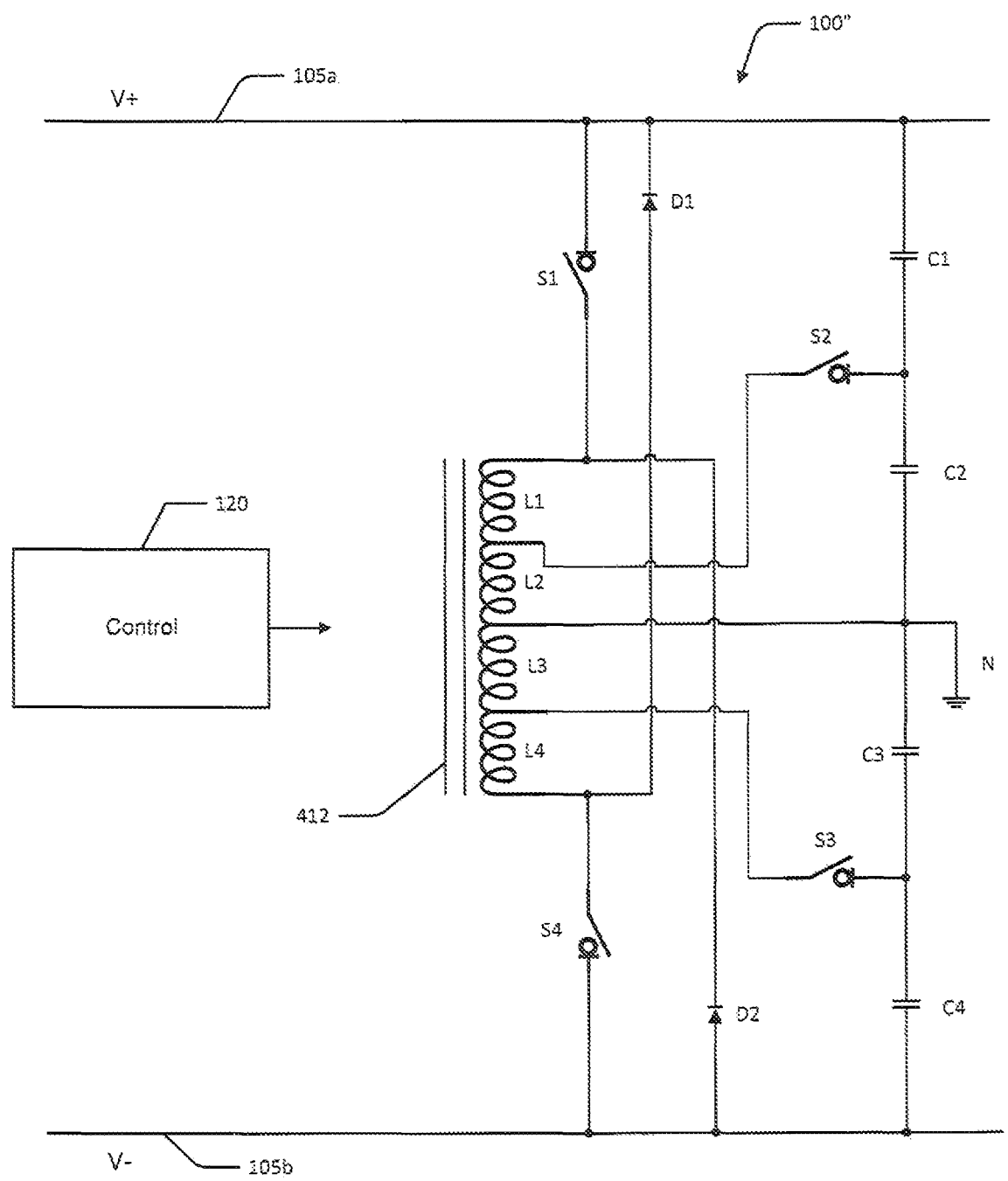
FIG. 4 is a schematic diagram illustrating a bus balancer apparatus according to further embodiments.

The control circuit 120 of FIGS. 1, 3 and 4 may be implemented using any of variety of different analog and/or digital circuit components. For example, the control circuit 120 may be implemented using a data processing device, such as a microcontroller, along with peripheral circuitry configured to drive the first, second, third and fourth switches S1, S2, S3, S4. In some embodiments, the first, second, third and fourth switches S1, S2, S3, S4 may be controlled using analog and/or discrete digital circuitry that provides similar functionality.

Figure 5:
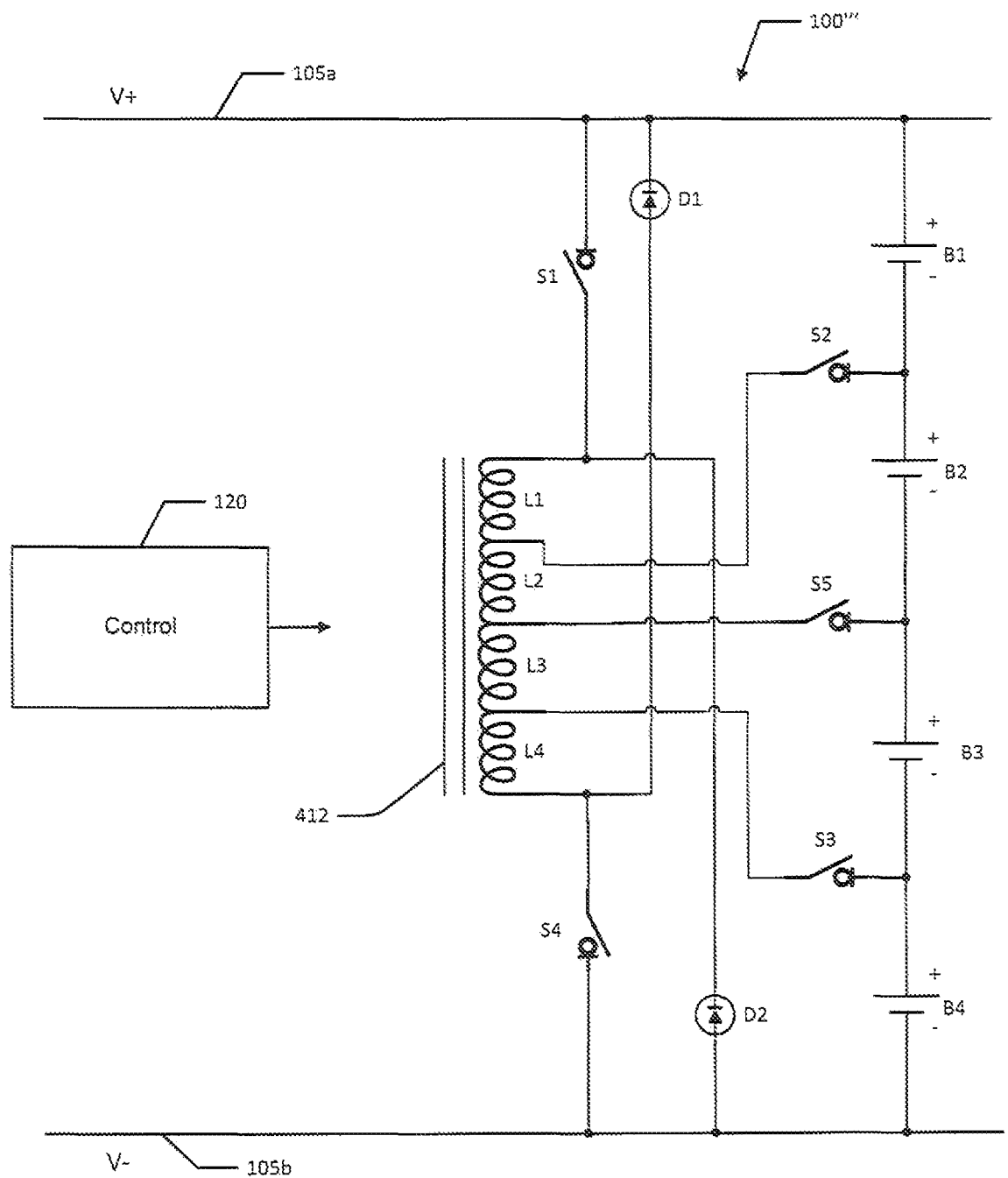
FIG. 5 is a schematic diagram illustrating a bus balancer apparatus for a battery string according to some embodiments.
Figure 6:
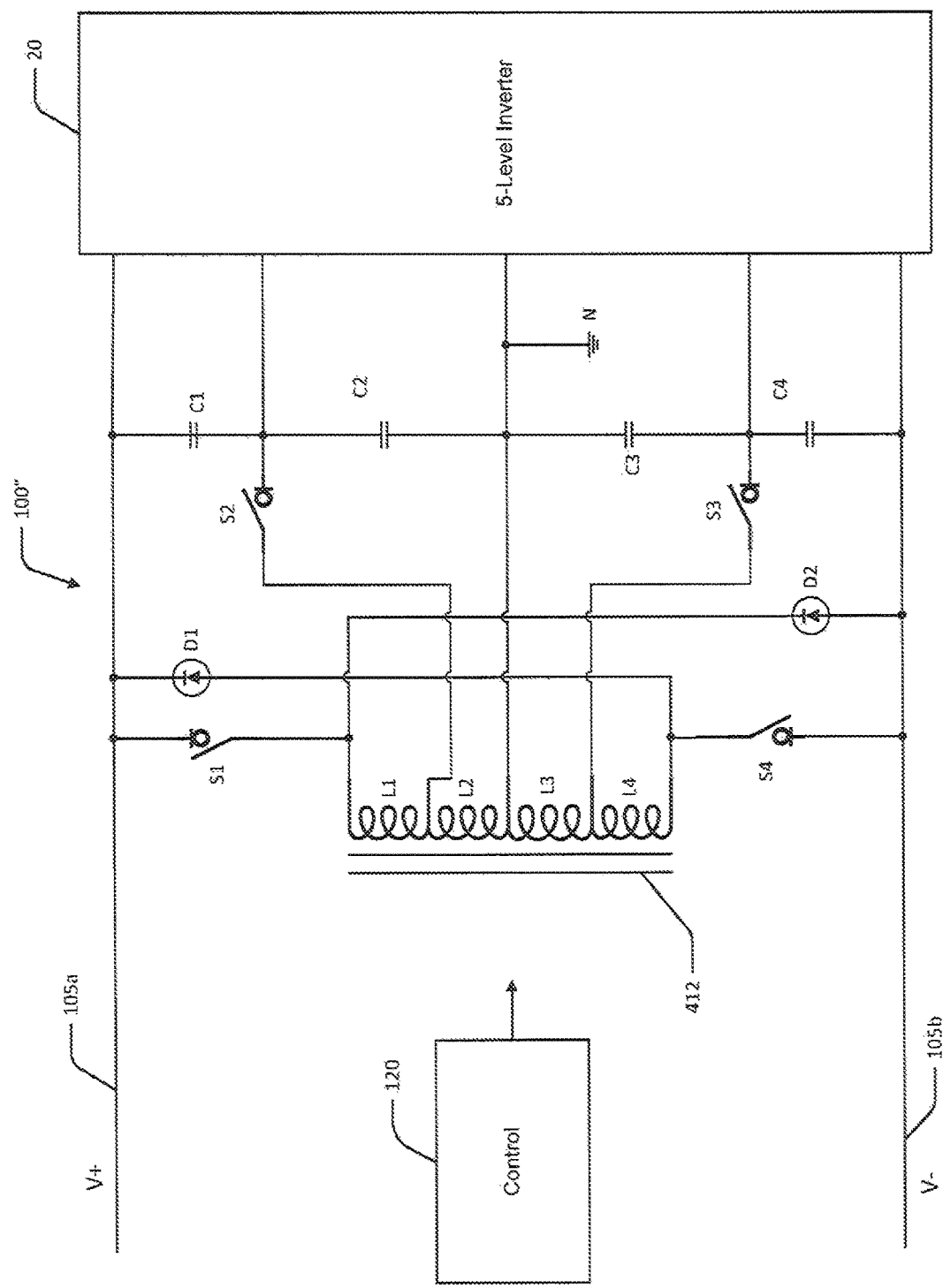
FIG. 6 is a schematic diagram illustrating use of a bus balancer apparatus with a 5-level inverter according to some embodiments.

According to further embodiments, bus balancer apparatus along the lines discussed above may be used to balance voltages across other types of devices, such as serially-connected batteries or other energy storage devices. For example, FIG. 5 illustrates the use of the bus balancer apparatus 100"" similar to the balancer apparatus 100" of FIG. 4, except for the removal of the neutral connection and addition of a switch S5, which may be used to balance voltages across batteries in a string of serially-connected batteries B1, B2, B3, B4. The switches S1, S2, S3, S4, S5 may be operated at a common near 50% duty cycle along lines discussed above. Such an arrangement may be particularly advantageous in, for example, lithium-ion battery systems, in which maintaining equilibrium among cells in a battery string may be important in preventing thermal runaway. Further applications of balancer apparatus include balancing of capacitors for multi-level converters. For example, FIG. 6 illustrates the use of the balancer apparatus 100" of FIG. 4 in conjunction with a 5-level inverter 20.

Figure 7:
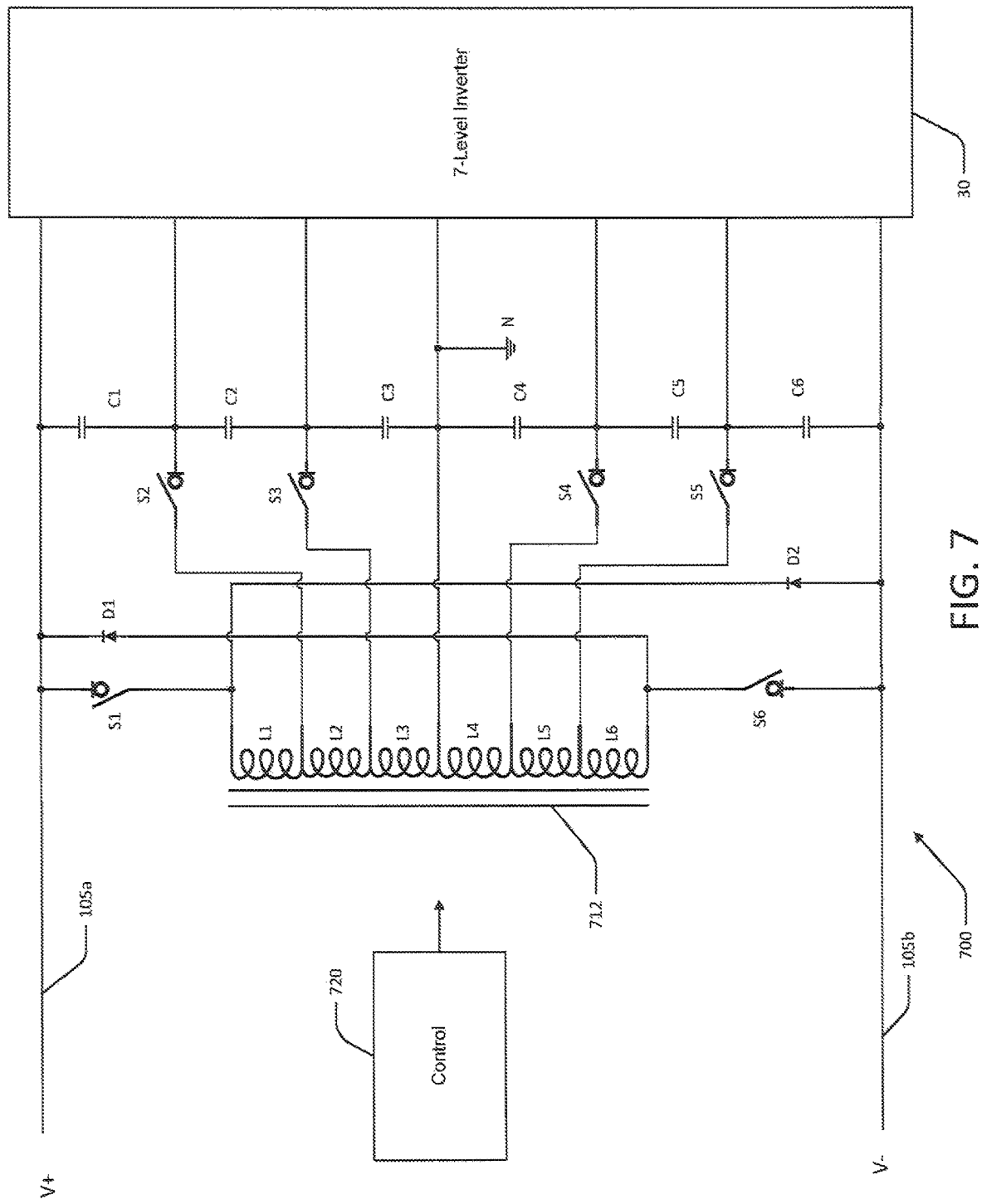
FIG. 7 is a schematic diagram illustrating use of a bus balancer apparatus with a 7-level inverter according to some embodiments.

Balancer apparatus according to some embodiments of the inventive subject matter are also scalable for strings having larger numbers of energy storage devices. For example, FIG. 7 illustrates a balancer apparatus 700 configured to balance voltages across six capacitors C1, C2, C3, C4, C5, C6 that are serially connected between first and second DC buses 105a, 105b that feed a 7-level inverter 30. The apparatus 700 includes six series-connected windings L1, L2, L3, L4, L5, L6 wound on a common core 712. A first switch S1 is configured to couple a first terminal of the first winding L1 to the first DC bus 105a. A second switch S2 is configured to connect a second terminal of the first winding L1 and a first terminal of the second winding L2 to a medial node of the string of capacitors C1, C2, C3, C4, C5, C6 at which the first and second capacitors C1, C2 are connected. A third switch S3 is configured to couple a second terminal of the second winding L2 to a medial node of the string of capacitors C1, C2, C3, C4, C5, C6 at which the second and third capacitors C2, C3 are connected. A second terminal of the third winding L3 and a first terminal of the fourth winding L4 are connected to a neutral node N which the third and fourth capacitors C3, C4 are connected. A fourth switch S4 is configured to connect a second terminal of the fourth winding L4 and a first terminal of the fifth winding L5 to a medial node of the string of capacitors C1, C2, C3, C4, C5, C6 at which the fourth and fifth capacitors C4, C5 are connected. A fifth switch S5 is configured to connect a second terminal of the fifth winding L5 and a first terminal of the sixth winding L6 to a medial node of the string of capacitors C1, C2, C3, C4, C5, C6 at which the fifth and sixth capacitors C5, C6 are connected. A sixth switch S6 is configured to connect a second terminal of the sixth winding L6 to the second DC bus 105b. A first diode D1 is connected between the second terminal of the sixth winding L6 and the first DC bus 105a, and a second diode D2 is coupled between the first terminal of the first winding L1 and the second DC bus 105b.

The windings L1, L2, L3, L4, L5, L6 have an approximately 1:1 turns ratio and a control circuit 720 controls the first, second, third, fourth, fifth and sixth switches S1, S2, S3, S4, S5, S6 such that the first, second, third, fourth, fifth and sixth switches S1, S2, S2, S3, S4, S5, S6 operate at the substantially the same duty cycle. In some embodiments, the first, second, third, fourth, fifth and sixth switches S1, S2, S3, S4, S5, S6 may be operated at a duty cycle of around 50%. It will be appreciated that this arrangement can be expanded to strings with even greater numbers of energy storage devices (e.g., capacitors, batteries, supercapacitors) using additional windings and switches. Although the embodiments described above are used to balance voltages for strings having an even number of energy storage devices, further embodiments may similarly use an odd numbers of winding to balance strings with a corresponding odd number of serially-connected energy storage devices.

Figure 8:
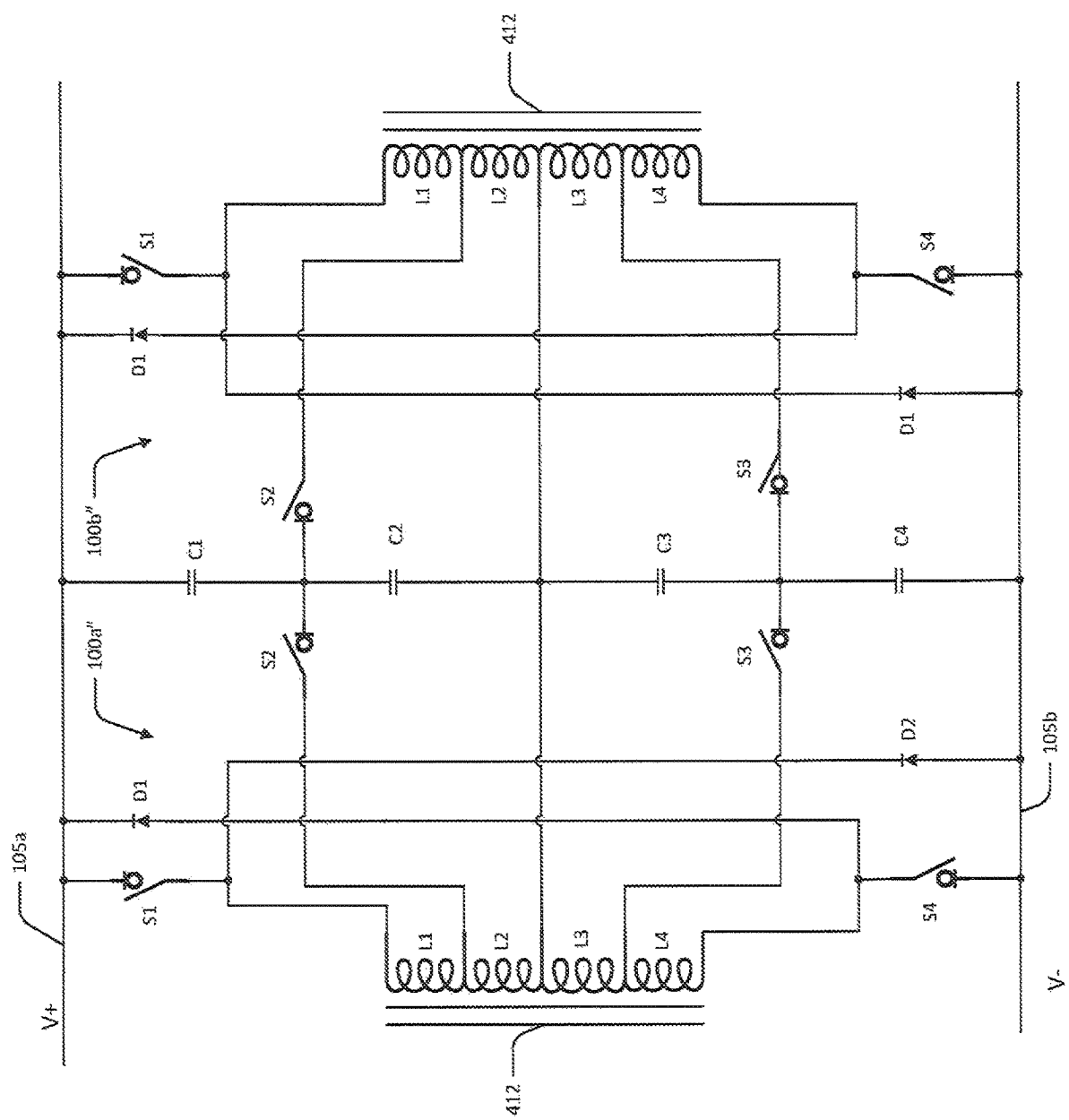
FIG. 8 is a schematic diagram illustrating an interleaved bus balancer apparatus according to some embodiments.
Figure 9:
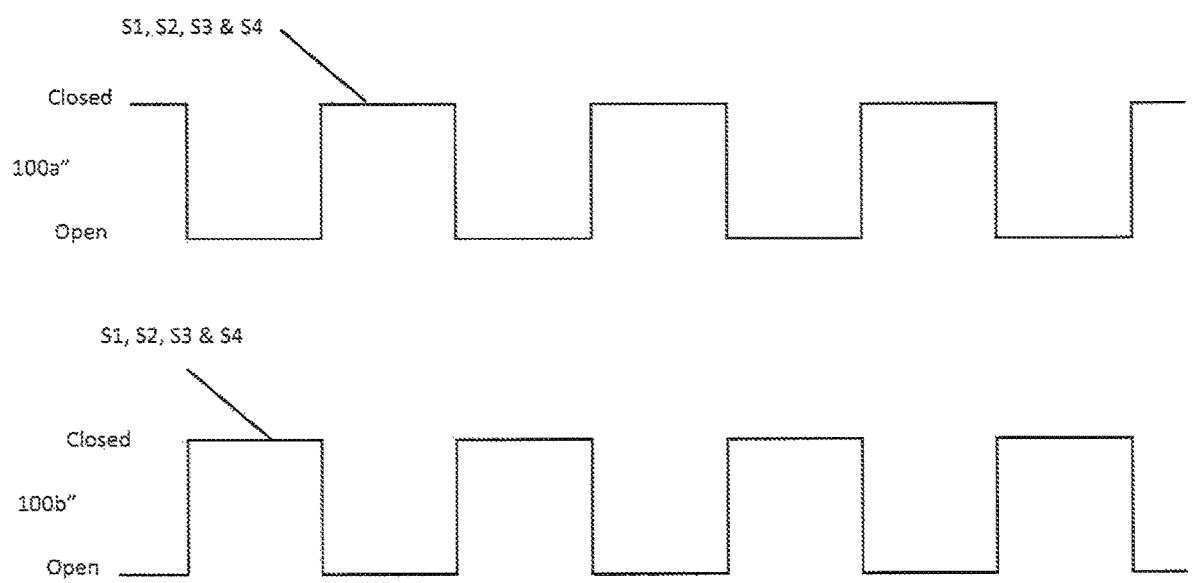
FIG. 9 is a waveform diagram illustrating operations of the apparatus of FIG. 8.

According to additional aspects, multiple balancer apparatus along the lines described above operating in an interleaved fashion may be used to provide improved performance. Referring to FIG. 8, first and second balancer apparatus 100a", 100b" similar to the balancer apparatus 100' of FIG. 4 are provided. As shown in FIG. 9, the switches S1, S2, S3, S4 of the first and second balancer apparatus 100a", 100b" are operated at around a 50% duty cycle and in a complementary fashion such that the switches S1, S2, S3, S4 of the first balancer apparatus 100a" are "off" when the switches S1, S2, S3, S4 of the second balancer apparatus 100b" are "on," and the switches S1, S2, S3, S4 of the second balancer apparatus 100b" are "off" when the switches S1, S2, S3, S4 of the first balancer apparatus 100a" are "on." This enables balancing to occur on a substantially continuous basis.

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

That which is claimed:

1. An apparatus comprising:
   a string of energy storage devices connected in series;
   a first winding and a second winding on a first core in a transformer arrangement and having first taps coupled in common to a first node of the string;
   third and fourth windings on a second core in a transformer arrangement and having first taps coupled in common to the first node;
   a first switch configured to selectively couple a second tap of the first winding to a second node of the string;
   a second switch configured to selectively couple a second tap of the second winding to a third node of the string;
   a third switch configured to selectively couple a second tap of the third winding to the second node;
   a fourth switch configured to selectively couple a second tap of the fourth winding to the third node; and
   a control circuit configured to control the first, second, third and fourth switches.

2. The apparatus of claim 1, wherein the control circuit is configured to operate both of the first and second switches at a first duty cycle and to operate both of the third and fourth switches at a second duty cycle that is complementary to the first duty cycle.

3. The apparatus of claim 1, further comprising a multi-level inverter circuit connected to the first, second and third nodes.

4. The apparatus of claim 1, wherein the first node is coupled to a neutral.

5. The apparatus of claim 1, further comprising:
   a fifth winding on the first core and having a first tap connected to the second tap of the first winding;
   a sixth winding on the first core and having a first tap connected to the second tap of the second winding;
   a seventh winding on the second core and having a first tap connected to the second tap of the third winding;
   an eighth tap on the second core and having a first tap connected to the second tap of the fourth winding;
   a fifth switch configured to selectively couple a second tap of the fifth winding to a fourth node of the string;
   a sixth switch configured to selectively couple a second tap of the sixth winding to a fifth node of the string;
   a seventh switch configured to selectively couple a second tap of the seventh winding to the fourth node; and
   an eighth switch configured to selectively couple a second tap of the eighth winding to the fifth node,
   wherein the control circuit is configured to control the fifth, sixth, seventh and eighth switches.

6. The apparatus of claim 5, wherein the control circuit is configured to operate the first, second, fifth and sixth switches at a first duty cycle and to operate the third, fourth, seventh and eight switches at a second duty cycle that is complementary to the first duty cycle.

7. The apparatus of claim 5, further comprising a multi-level inverter circuit connected to the first, second, third nodes, fourth and fifth nodes.

8. The apparatus of claim 5, wherein the first node is coupled to a neutral.

\* \* \* \* \*

UNITED STATES PATENT AND TRADEMARK OFFICE
CERTIFICATE OF CORRECTION

PATENT NO. : 10,944,280 B2  
APPLICATION NO. : 16/513779  
DATED : March 9, 2021  
INVENTOR(S) : Oughton, Jr.

Page 1 of 1

It is certified that error appears in the above-identified patent and that said Letters Patent is hereby corrected as shown below:

On the Title Page

Item [73]: delete "Eaton Intelligent Power Limited" and insert -- Eaton Intelligent Power Limited (IE) --

In the Specification

Column 5, Line 60: delete "100' of FIG. 4" and insert -- 100" of FIG. 4 --

Signed and Sealed this  
Fourth Day of January, 2022

Drew Hirshfeld  
*Performing the Functions and Duties of the*  
*Under Secretary of Commerce for Intellectual Property and*  
*Director of the United States Patent and Trademark Office*